K. C. COX.
TELEGRAPHY.
APPLICATION FILED JULY 17, 1917.

1,392,302.

Patented Oct. 4, 1921.
8 SHEETS—SHEET 1.

Witnesses
Jas. K. McCathran
J. H. Siggers

Inventor
Kenwrick C. Cox,
By E. G. Siggers
Atty.

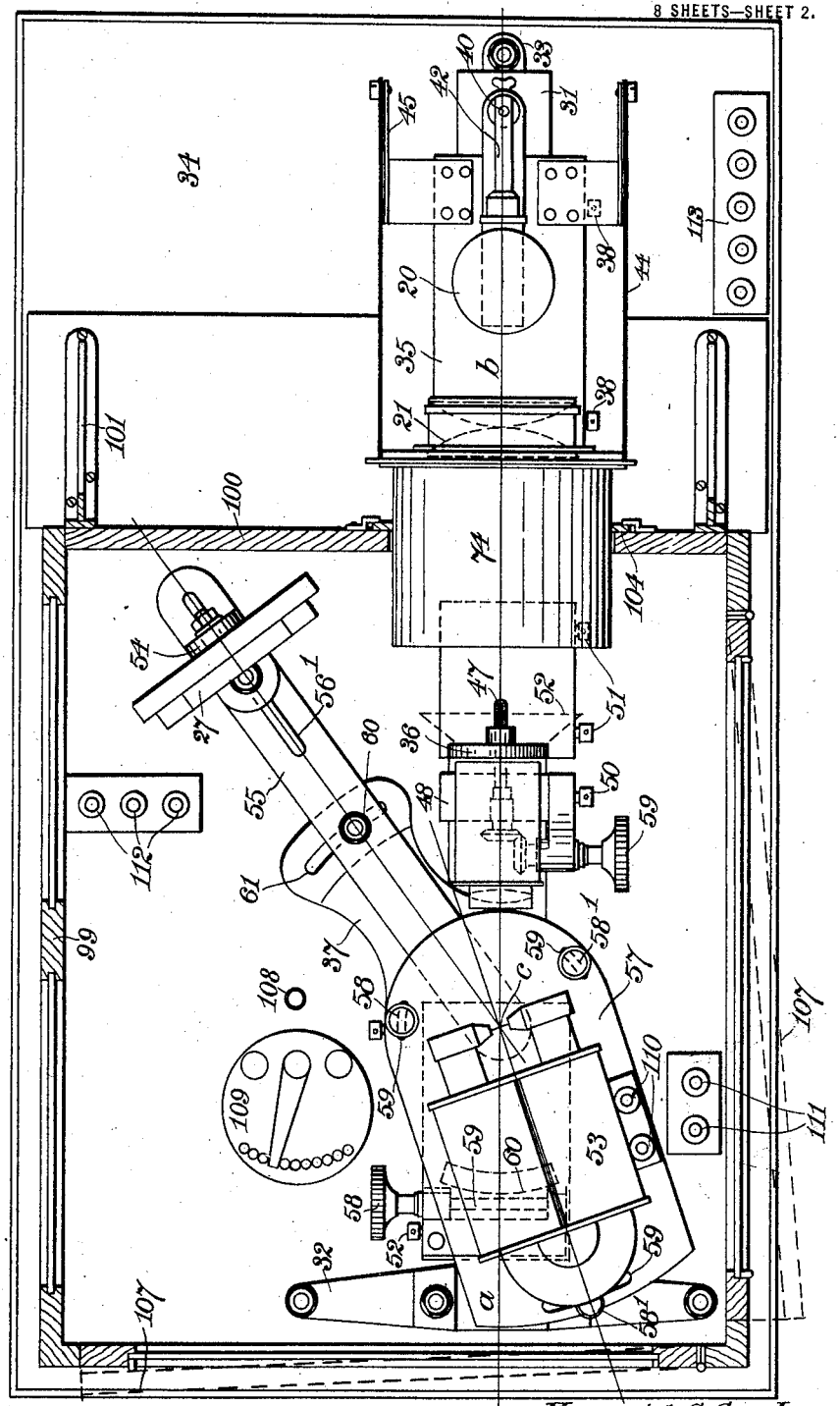

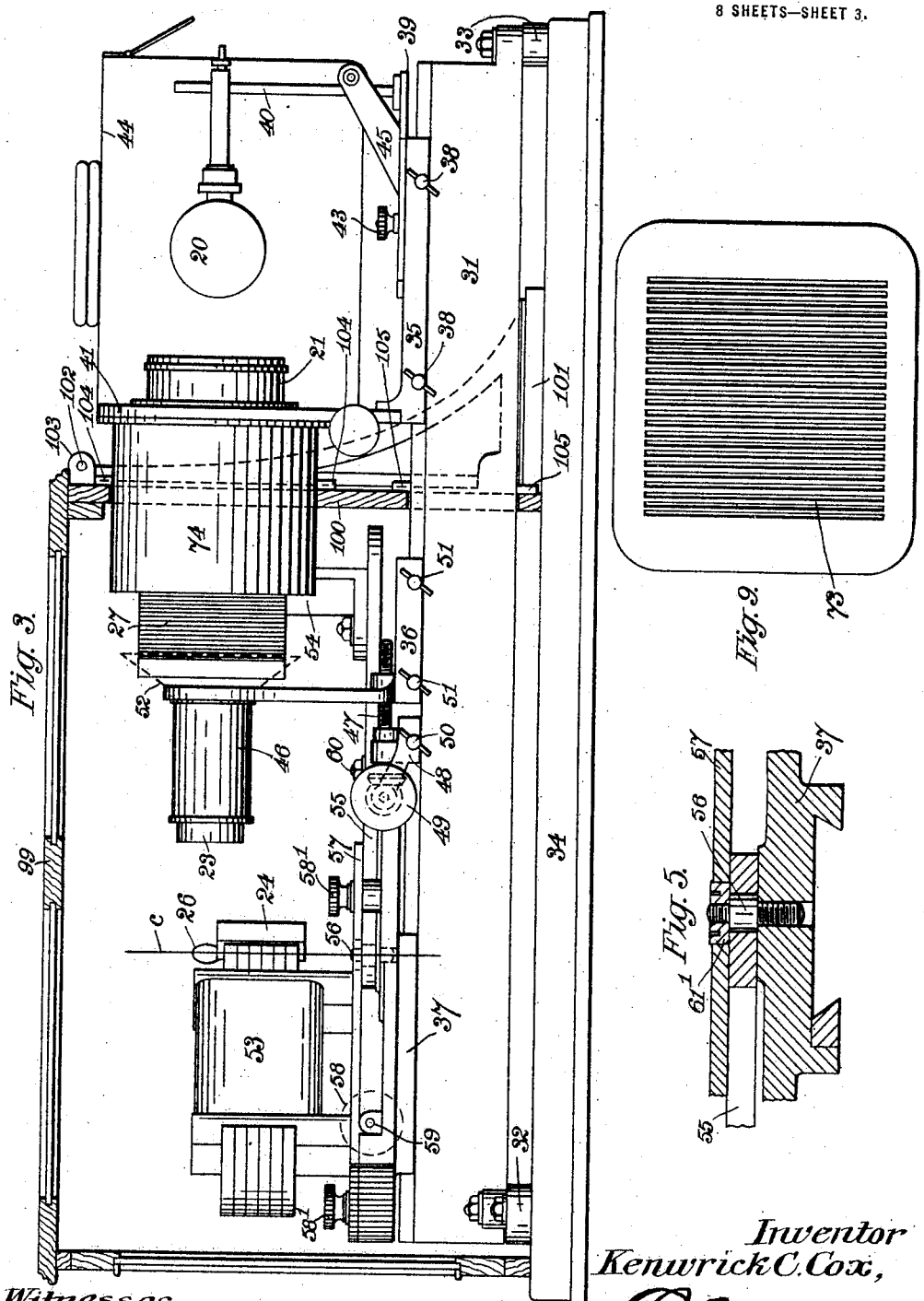

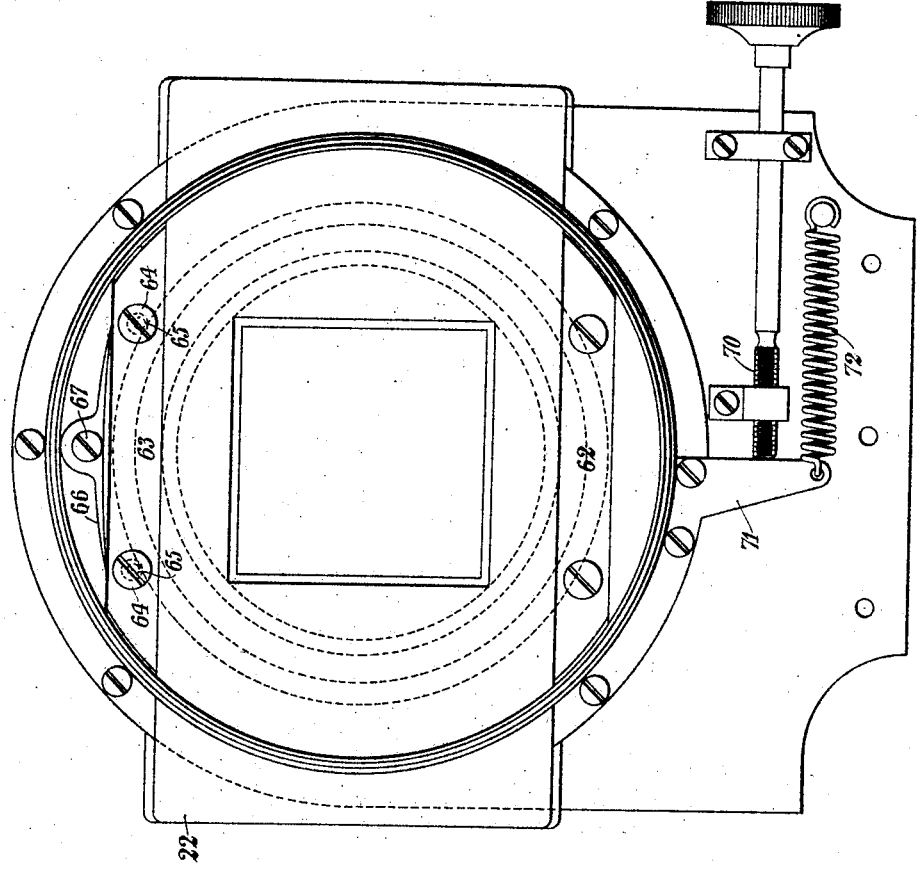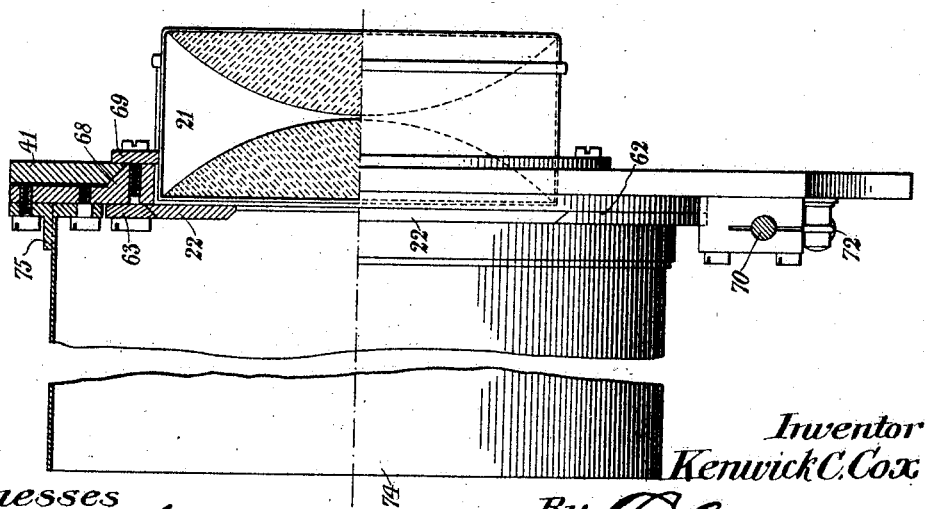

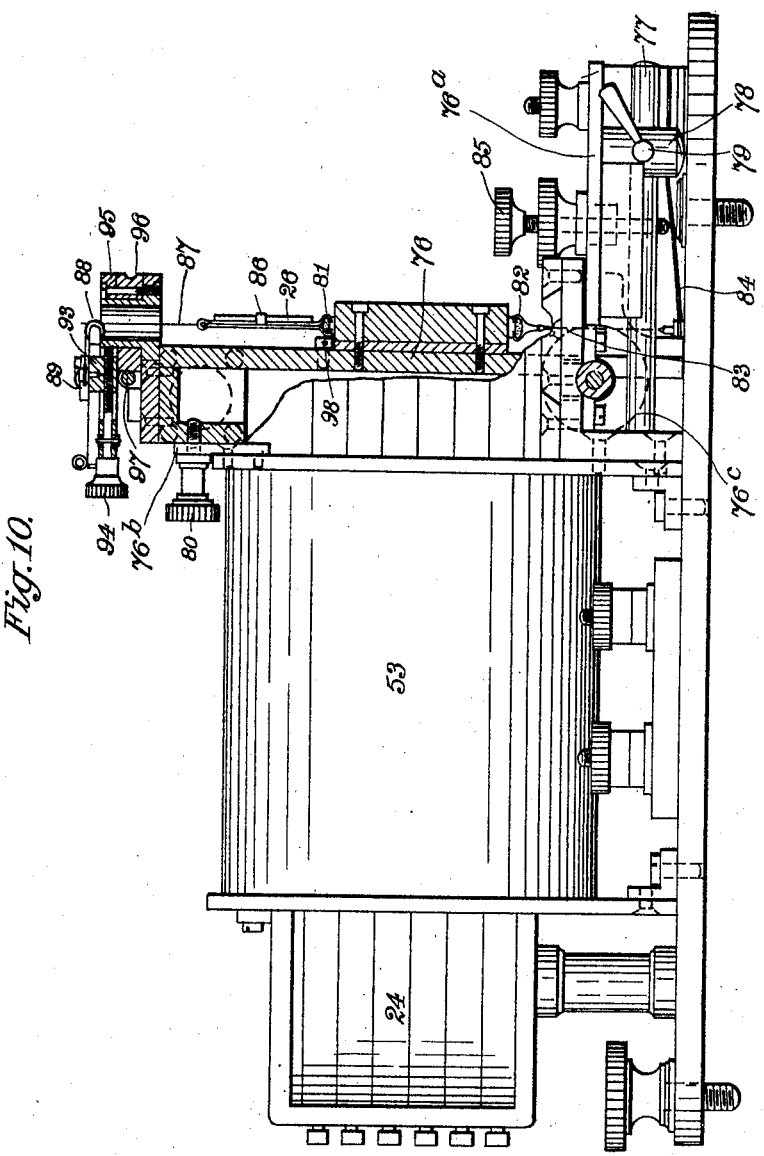

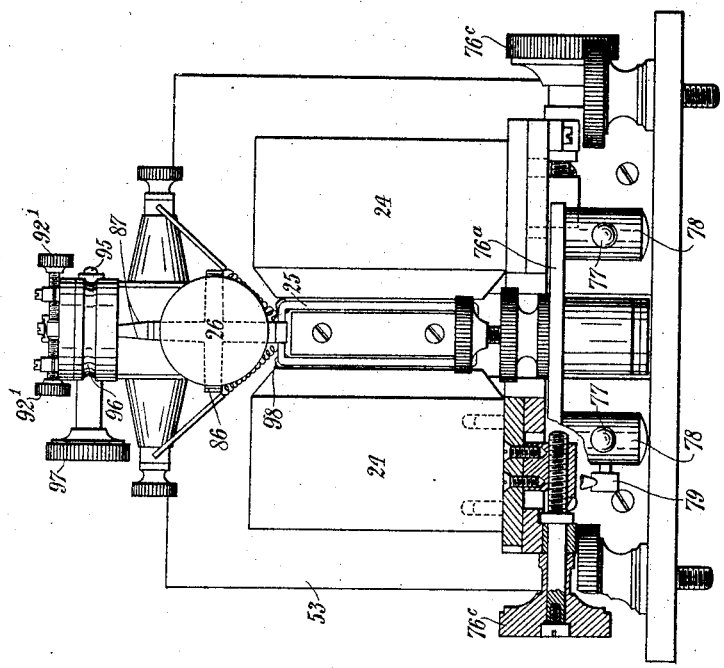

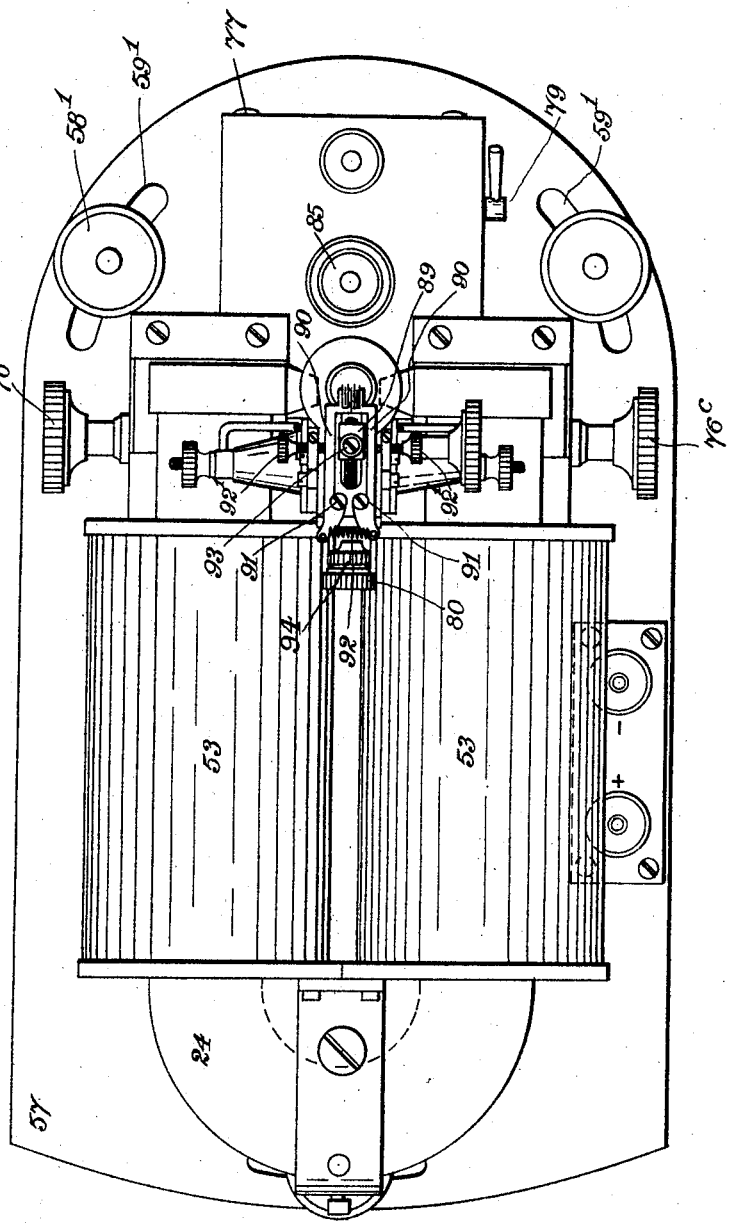

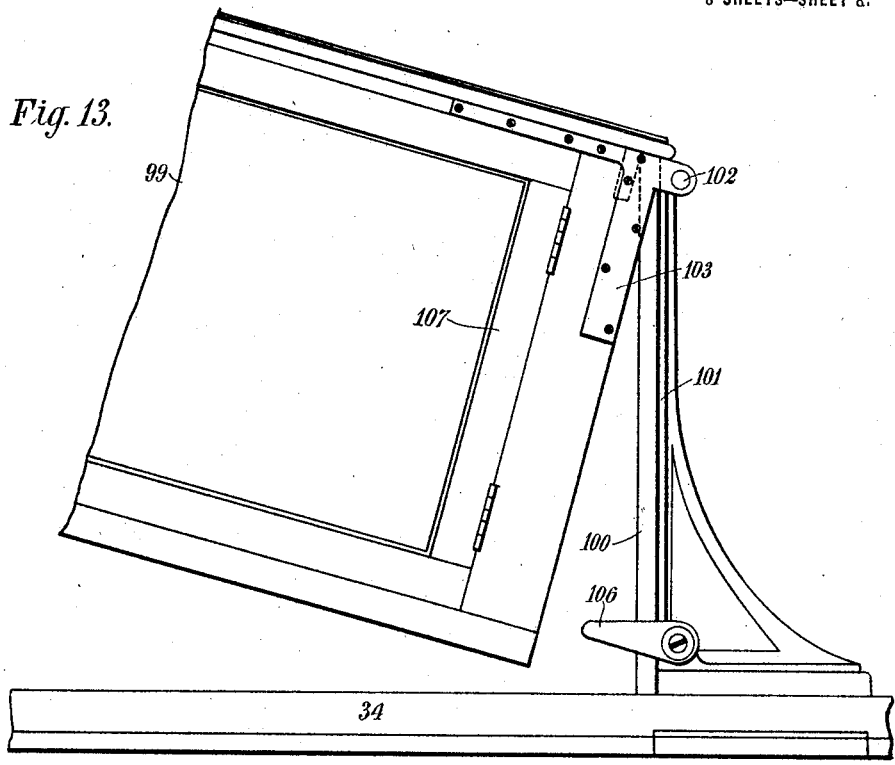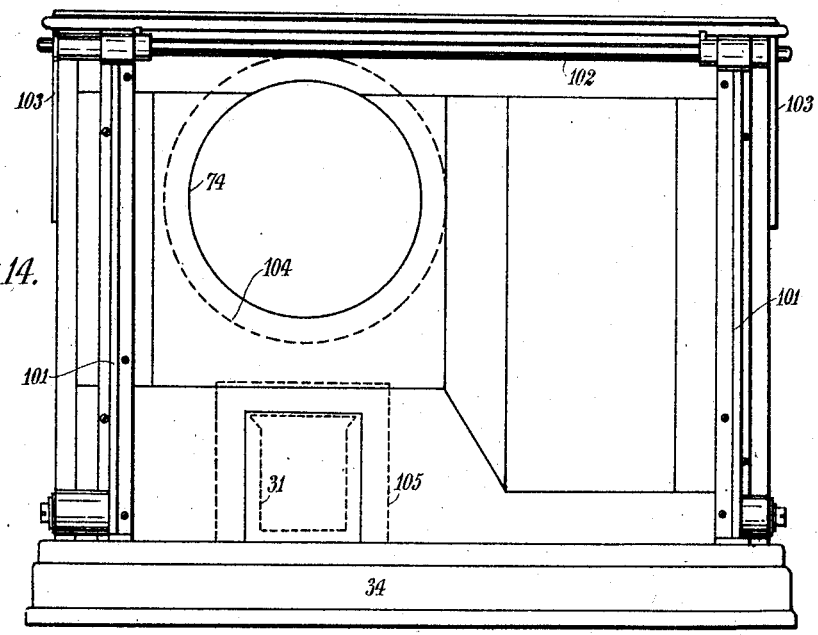

UNITED STATES PATENT OFFICE.

KENWRICK CECIL COX, OF NORFOLK ISLAND, SOUTH PACIFIC.

TELEGRAPHY.

1,392,302.  Specification of Letters Patent.  Patented Oct. 4, 1921.

Application filed July 17, 1917. Serial No. 181,462.

*To all whom it may concern:*

Be it known that I, KENWRICK CECIL COX, a subject of His Majesty the King of England, and resident of Norfolk Island, South Pacific, have invented certain new and useful Improvements in Telegraphy, of which the following is a specification.

This invention relates to improvements in telegraphy and more particularly to submarine telegraphy in which a selenium relay is employed such as that described in the specification of my prior Letters Patent of the United States, No. 1158375.

The primary object of the present invention is the provision of apparatus of improved construction and arrangement and in which the various parts are so mounted that the relative adjustments required in practice can be readily effected.

The invention is hereinafter described with reference to the accompanying drawings, in which:—

Fig. 2 is a plan view of the apparatus;

Fig. 3 is a side elevation of the same;

Fig. 5 is a detail sectional view illustrating the vertical stud about which the galvanometer rotates.

Fig. 6 is an enlarged sectional side elevation of the condenser and slide;

Fig. 7 is an enlarged front elevation thereof;

Fig. 9 is a front view of the grid;

Fig. 10 is an enlarged side elevation of the galvanometer;

Fig. 11 is a similar front elevation of same;

Fig. 12 is a plan view thereof;

Fig. 13 is a detail side elevation of the case of the instrument; and

Fig. 14 is a back elevation of the said case.

Figure 4:
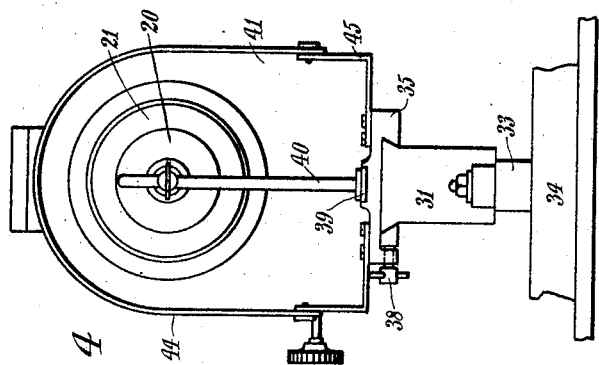
Fig. 4 is an end elevation of the same.
Figure 8:
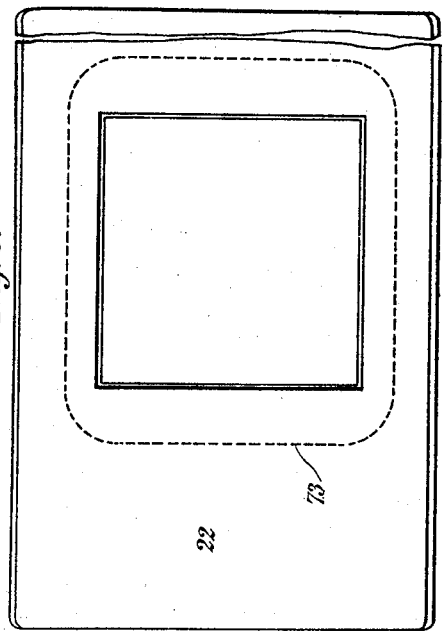
Fig. 8 is a front view of the slide.
Figure 1:
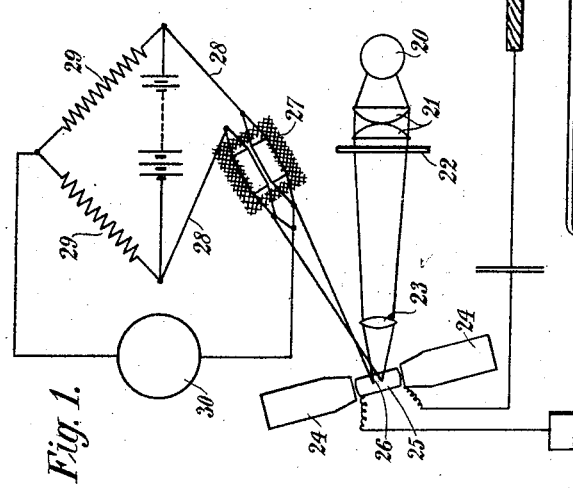
Figure 1 is a diagram illustrating the general arrangement of the apparatus.

As shown, and in carrying out the present invention I provide a source of light 20 such as that used in optical projection, an ordinary double plano-convex condenser 21 such as that used in optical lanterns, and a slide 22 which sub-divides the projected beam of light as required. The rays of light are focused by means of a lens 23 so as to form the desired image of the slide on the selenium cell or cells. Mounted between the poles of the field magnet 24 of the receiving galvanometer which is actuated by the currents received from the cable is a moving coil 25 to which a mirror 26 is attached so that the coil and the mirror are deflected to right or left according to whether a positive or negative current is received from the cable. The cell or cells 27 or the sections thereof are preferably arranged in a Wheatstone bridge or other circuit 28, with suitable resistances 29 for balancing the system. In this circuit 28 the relay instrument, recorder, or other apparatus 30 is arranged so as to be actuated by the currents caused to flow through it by the movement of the beam or beams of light over the selenium cell 27. The light is so reflected from the mirror 26 that about half of each cell or section thereof is light and half dark.

As it is desirable to insure that the relative positions of the condenser 21, slide 22, lens 23, mirror 26 and cell 27, shall be capable of being rigidly fixed while allowing of convenient and ready adjustment when necessary, the following improved means shown in Figs. 2 to 5 are provided for the purpose of effecting this relative fixing and adjustment of the parts.

According to this invention the various parts of the apparatus are adjustably mounted upon an iron bed 31 similar to a lathe bed. One end of the bed is bolted to a suitable foot 32, and the other rests on a short pillar 33, the bed being secured through these three points of support to a suitable wood or metal base 34. On this bed are slidably mounted a saddle 35 which carries the lamp 20, condenser 21, and slide 22, a bracket 36 which carries the lens 23 and another saddle 37 which carries the galvanometer 24, 25 and the selenium cell or cells 27. The lamp-carrying saddle 35 is arranged to slide on the bed 31 and is provided with screws 38 for locking it in any desired position. On this saddle are mounted a foot 39 and a pillar 40 which carries the lamp 20 and a front plate 41 which carries the condenser 21 and the slide 22, which will be further described in detail. The foot is adapted to slide, by means of a slot 42, so that the distance between the lamp 20 and the condenser 21 may be adjusted and the lamp may be raised or lowered or turned to the right or to the left on its pillar 40. A lamp of the focus type with a tightly coiled filament arranged in a small space is preferably provided but any suitable lamp may be used, and the foot and pillar may be replaced by other mounting means. The foot and pillar shown are however suitable for the various types of lamp that are suitable for the purposes of this invention. The foot is secured in position by a clamping nut 43. The lantern is provided with a light metal hood 44 which is hinged to brackets 45 so that it may be opened. This hood is provided with a ventilator of the usual type as shown.

The lens carrying bracket 36 is arranged to slide on the bed 31 and a fine adjustment for the position of the lens may be provided by means of a rack and pinion operating a sliding tube, as in the usual types of optical lanterns, but for the purposes of this invention it is desirable that the lens should be held as rigidly as possible while still allowing of ready adjustment. The lens mount therefore is screwed rigidly into a tube 46 which is attached rigidly to the supporting bracket and fine adjustment of the position of the lens is obtained by sliding the bracket along the bed by means of the adjusting screw 47 which is mounted to revolve in a block 48 and geared to a milled operating head 49. This block 48 is locked in any required position in the bed by means of a screw 50 so that the rough adjustment of the position of the lens is obtained by shifting both the said block and the supporting bracket and the fine adjustment by locking the block 48 on the bed and turning the adjusting screw 47 by means of the milled head 49. After the position of the lens 23 is finally adjusted the supporting bracket 36 is locked in position by means of suitable locking screws 51 provided for this purpose. A conical screen 52 indicated by dotted lines is fixed to the supporting bracket 36 in order to cut off any scattered light proceeding from the condenser and slide.

The saddle 37 which carries the galvanometer and the selenium cell is locked in position in the bed by means of suitable set screws 52. The field magnet 24 of the galvanometer is preferably of the usual hybrid type as used for siphon recorders, and the mirror 26 is attached to the moving coil 25 which is suspended by an improved bifilar suspension to be further hereinafter described. When the light from the lamp 20 passes through the condenser 21 the slide 22 and the lens 23 to the mirror 26 whence it is reflected on to the selenium cell 27, an image of the said slide 22 is formed in such a way as to leave half of each section of the cell light and half dark as indicated. The cell 27 is mounted on a supporting bracket 54 which is bolted to a horizontal arm 55 at any required distance from the mirror 26, a slot 56 being provided in the said arm to allow of the bracket 54 being moved along the arm.

It is desirable that the angle made by the mirror 26 with the optical center line $a\ b$ should be as large as possible, i. e. that it should be as near a right angle as possible in order that the mirror may present the maximum area to the rays of light proceeding from the lens and so intercept, and reflect to the cell as much as possible of this light. This angle then is preferably so adjusted that the reflected beam of light just passes clear of the edge of the lens and the angle made by the arm 55 with the optical center line $a\ b$ is adjusted so as to bring the image of the slide that is formed on the cell into correct position with regard to the sub-divisions of the cell 27. The angles formed by the mirror 26 when at zero and the horizontal arm 55 with the optical center line $a\ b$ should thus be capable of adjustment without altering the focus, size, definition or character of the image thrown on the cell, and this object is effected by placing the axis of movement $c$ of the mirror 26 on the optical center line $a\ b$ and arranging the horizontal arm 55 to rotate about a stud or pin 56 which is placed concentric with this axis $c$. The mirror 26 may also be rotated by any convenient means such as is ordinarily employed to adjust the zero of a siphon recorder, the means which I prefer to employ being described hereafter; but in addition to this adjustment I use a more convenient means of adjustment by rotating the whole galvanometer about a stud or pin concentric with the axis of movement of the mirror, the stud or pin being the same as that 26 about which the horizontal arm 55 rotates. This stud 56 is as shown in Fig. 5 screwed into the main supporting saddle 37 at the point of intersection of the optical center line $a\ b$ and that of the horizontal arm 55 and that $c$ of the mirror 26.

The galvanometer is mounted on a base plate 57 which rests on the supporting saddle 37 and is caused to rotate about its stud 56 by means of a milled head 58 actuating the tangent screw 59, which is mounted on the said saddle and gears with a worm sector 60 which is attached to the base plate 57 of the galvanometer. The milled head 58 then provides the ordinary zero adjustment of the apparatus such as may be required from time to time in ordinary practice. The stud 56 about which the horizontal arm 55 and the galvanometer rotate is preferably screwed into the supporting saddle as shown and the said arm 55 is fitted to rotate about a thickened part of the stud and is held down by a suitable lock nut 61. The galvanometer base plate 57 is formed with a hole concentric with the axis of motion of the mirror so that the said base plate may rotate about the said stud 56. The galvanometer may be locked rigidly to the supporting saddle 37 by means of three screws 58' which pass through slots 59 in the base plate 57. The horizontal arm 55 may be rocked rigidly to the supporting saddle 37 by means of a bolt 60 which works in a slot 61 formed in an extension of the said saddle.

In the practical application of my invention it is desirable to provide means whereby the lines of the projected image of the slide may be readily adjusted so as to be parallel with the lines of sub-division of the selenium cell.

I may provide for this either—

(1) By arranging the cell 27 so that it may be rotated through a small angle by means of a worm wheel and tangent screw or other suitable means, or (2) By arranging the slide 22 so that it may be rotated through a small angle about the optical center line $a$ $b$.

In one suitable method of carrying out the latter arrangement the slide 22 is held firmly by two V guides, 62, 63, one 62 of which is fixed, while the other 63 is held by shoulder screws 64 working in short slots 65, and is pressed against the slide 22 by a spring 66 which is pivoted on a suitable shoulder screw 67. The slide slides smoothly and rather stiffly between its two guides 62 and 63. These guides are mounted on a carrying ring 68 which is fitted into a circular opening in the aforesaid supporting plate 41 and is arranged to rotate through a small angle. The carrying ring 68 is held in place by a flange 69 of the tube that carries the brass case containing the condenser 21. The carrying ring 68 is caused to rotate by a screw 70 which presses on an arm 71 attached thereto and works in opposition to the tension of a returning spring 72. If the screw is withdrawn the spring pulls the arm and ring around, or if the screw is advanced the spring is further extended and the arm and ring caused to rotate in the opposite direction. Instead of the screw 70, arm 71 and spring 72, I may arrange a worm wheel, or a segment of one, on the ring 68, so as to gear with a tangent screw in such a way that on turning the screw the worm wheel and ring will be caused to rotate.

In one preferred and convenient form of slide 22 used, the beam of light is split up into bars by means of a grid 73, but any other suitable construction of slide may be used such as is commonly employed in optical projection. For instance, the slide may be made of glass or other transparent material, and opaque bars may be painted on it. The slide and its guides are preferably inclosed by a tube 74 secured by means of a flange 75 to the carrying ring 68, the flange 75 being cut away just enough to allow the slide to pass through it. This tube projects into the case, to be described later, which incloses the apparatus with the object of excluding damp air and insects.

The galvanometer already referred to above consists of a field magnet 24 and a removable suspension piece 76, on which are mounted the moving coil 25 and the mirror 26. The field magnet 24 may be either a permanent magnet such as is commonly used for siphon recorders, or as shown an electro magnet. If the former it is preferably provided with the usual hybrid windings 53 and it is secured to its base plate by any convenient means.

For the suspension piece 76 the object aimed at is to eliminate the faults common to many of the patterns of coil suspension used in siphon recorders and similar instruments. These faults being:—

(1) A slight friction which must in some patterns of suspension take place, at least theoretically between the suspending threads or wires and their supports when the coil is deflected, and (2) A tendency for the said threads or wires to shift at their points of control or support when the coil is violently deflected from any cause, and so to shift the zero position of the coil.

By this invention the suspension piece 76 is attached to the field magnet in a manner similar to that used in the well known Tinsley siphon recorder. It rests on two horizontal rods 77 which pass through holes in short pillars 78 attached to the base of the suspension piece 76, and is clamped in position by a screw 79. The top of the suspension piece 76 is also held rigidly against the upper part of the field magnet bobbins or other rigid support, by a screw 80. The suspended coil 25 is of the usual recorder type and is held at its top and bottom by aluminium clips 81, 82, in the usual way. A phosphor bronze strip 83 is attached to the lower clip 82 and to one end of a flat spring 84, the other end of this spring being secured rigidly to the suspension frame in a manner which allows of the spring being shifted so as to adjust the position of the said strip 83 and the lower end of the coil 25. The tension of the flat spring 84 and thus the pull it exerts on the phosphor bronze strip is adjusted by means of a screw 85. The upper clip 81 of the coil 25 is made long and is provided with light cross arms 86 to support the mirror 26 which is secured to the clip 81 with wax or other suitable means. A thread or preferably a phosphor bronze wire 87 is passed in the usual way through the top of this clip, up over two V edge rollers 88 and around the roller 89. The rollers 88 are mounted on two arms 90 which are pivotally mounted at 91. A spring 92 tends to separate the ends of the pair of arms 90 which carry the two rollers 88, and screws 92 serve to force these arms together. The two rollers 88 and the suspension wires 87 may thus be adjusted sidewise as required, and may be brought nearer together or moved farther apart so as to reduce or increase the strength of their control over the movement of the coil 25. The roller 89 is mounted on a slide 93 which can be adjusted by means of a screw 94 and which serves to adjust the height of the coil by raising or lowering the suspending wire 87. The member 95 which carries the said roller 89 and the arms 90 is secured to a worm wheel 96 which is turned by means of a tangent screw 97 and is concentric with the axis of the coil 25. This provides the angular adjustment for the coil. A coil properly suspended as described will move with perfect freedom from friction in its suspending wires and strip, and so allow of the production of perfect signals, and at the same time it may be subjected to violent deflections without its permanent zero position being altered. Adjustable stops 98 are preferably provided to prevent any too violent deflection of the coil.

As it is generally important that apparatus as above described should be well protected from insects and damp air, especially in tropical climates, a special case 99 is provided in which the back 100 of the case is secured to brackets 101 which are fastened to the base 34. The whole of the rest of the case is hinged to the heads of the said brackets by means of a rod 102 which passes through the heads of the brackets and through two plates 103 attached to the case so that it may be turned back out of the way of the apparatus inclosed by it. The case is so constructed with panels as to minimize the effect on it of variations of temperature, humidity and the like. Where the tube 74 inclosing the slide 22 enters the back 100 of the case a hole larger than the diameter of the tube 74 is cut in the case, and an airtight joint is provided between the said tube and the said case by fitting a ring 104 to the tube 74 and pressing it against the back of the case by clips or by other means. The surfaces of the ring 104 where it bears on the tube 74 and against the case 100 are preferably covered with felt or other material suitable for making a practically airtight joint. The tube 74 may then be moved into or out of the case 99 with its supporting saddle 35 and it may move in any direction at right angles to its axis, i. e. parallel to the back of the case, (under the action of shrinkage, expansion or warping of the base or case such as would alter the relative positions of the tube 74 and the case 99) while always maintaining an airtight joint between these parts. A similar joint is arranged where the bed 31 of the apparatus enters the case, a jointing piece 105 being fitted to the bed and pressed against the back 100 of the case by clips or other means. If the bed is made hollow with an open space under it, this space is closed with a strip of wood so that the lower edge of the opening in the piece bears on this strip of wood. In order to insure that the sides of the case 99 shall fit close against the back 100 when the case is closed, a clip 106 is provided in order to hold the sides of the case firmly against the back when the case is closed. Strips of wood or other material are fitted to the base 34 along the lower edges of the case, so as to insure a practically airtight joint between the base and case. The case 99 may be provided with side doors and such doors 107 may conveniently be glazed and provided with blinds or shutters to darken them if required.

The wires for electrical connection to the moving coil of the galvanometer are conveniently led through a hole 108 in the base 34 to a suitable shunt box 109 and thence to the terminals of the coil in the usual manner. The hybrid coils 53 of the field magnet 24 are led to terminals 110 at their side and thence to terminals 111 on the base which are connected to other terminals on a board conveniently placed outside the case.

Similarly, the cell 27 is connected by wires to terminals 112 which again are connected to other terminals on the board 113 for convenient connection to other apparatus used in conjunction with this invention.

What I claim is:—

1. Telegraphic apparatus comprising, in combination, a common base having mounted thereon a source of light, a condenser, means located in the optical axis of the apparatus for subdividing the beam of light, a receiving galvanometer, a mirror on said galvanometer, a radio-sensitive cell under the influence of the beam of light, and means for adjusting angles of the galvanometer mirror and selenium cell with respect to the projected beam of light without altering the focus, size, definition or character of the projected image, the galvanometer and the cell being adjustable about a point concentric with the axis of movement of the galvanometer mirror substantially as described.

2. Telegraphic apparatus comprising a source of light, a condenser for the light, means located in the optical axis of the apparatus for subdividing the beam of light, a receiving galvanometer provided with a mirror, a radio-sensitive cell under the influence of the beam of light, and means for adjusting the "zero" of the galvanometer the said galvanometer being mounted to turn about a vertical pivot.

3. Telegraphic apparatus comprising a source of light, a condenser, a receiving mirror galvanometer, an arm pivoted at one end in the upright axis of the mirror of the galvanometer, a radio-sensitive cell carried by the other end of the arm in position to be under the influence of the beam of light, and means for adjusting the angles of the galvanometer mirror and the radio-sensitive cell with respect to the projected beam of light without altering the focus, size, definition or character of the projected beam of light, the galvanometer and the cell being adjustable about a point concentric with the axis of movement of the galvanometer mirror.

4. In telegraphic apparatus, a source of light constructed to project a beam of light, means located in the optical axis of the apparatus for subdividing the beam of light, a receiving mirror galvanometer, an arm mounted to move about the vertical axis of movement of the galvanometer mirror, and a selenium cell carried by the end of the arm remote from the mirror and movable with the arm about the upright axis of rocking of the galvanometer mirror.

5. Telegraphic apparatus comprising in combination, a common base having adjustably mounted thereon, a source of light, a condenser, a light subdividing slide for and interposed in the beam of light, a receiving galvanometer, a mirror on said galvanometer, a radio-sensitive cell under the influence of the beam of light, and means of adjusting the angles of the galvanometer mirror and selenium cell with respect to the projected beam of light without altering the focus, size, definition or character of the projected image.

6. Telegraphic apparatus comprising in combination, a common base having adjustably mounted thereon, a source of light, a condenser, a slide in the optical axis of the source of light for subdividing the beam of light, a receiving galvanometer, a mirror on said galvanometer, a radio-sensitive cell under the influence of the beam of light, and means for the adjustment of the "zero" of the galvanometer, said galvanometer being mounted to turn about a vertical pivot, substantially as described.

In testimony whereof I have hereunto signed my name.

KENWRICK CECIL COX.